United States Patent
Cao et al.

(10) Patent No.: US 11,935,322 B1
(45) Date of Patent: Mar. 19, 2024

(54) OBSTRUCTION-SENSITIVE WHITE POINT DETERMINATION USING FACE INFORMATION

(71) Applicant: Apple Inc., Cupertino, CA (US)

(72) Inventors: Renbo Cao, San Jose, CA (US); Christophe Seyve, Saratoga, CA (US); Yonghui Zhao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 391 days.

(21) Appl. No.: 17/369,416

(22) Filed: Jul. 7, 2021

Related U.S. Application Data

(60) Provisional application No. 63/078,109, filed on Sep. 14, 2020.

(51) Int. Cl.
  *G06V 40/16* (2022.01)
  *G06V 10/20* (2022.01)
  *G06V 10/26* (2022.01)
  *G06V 10/766* (2022.01)

(52) U.S. Cl.
  CPC ............ *G06V 40/16* (2022.01); *G06V 10/255* (2022.01); *G06V 10/26* (2022.01); *G06V 10/766* (2022.01)

(58) Field of Classification Search
  None
  See application file for complete search history.

(56) References Cited

U.S. PATENT DOCUMENTS

| 10,515,471 B2 * | 12/2019 | Um ..................... G06V 20/52 |
| 2009/0002519 A1 * | 1/2009 | Nakamura ............ H04N 23/88 |
| | | 348/E9.051 |
| 2009/0167892 A1 * | 7/2009 | Takayama .............. H04N 23/88 |
| | | 348/223.1 |
| 2015/0054980 A1 | 2/2015 | Nikkanen |

(Continued)

FOREIGN PATENT DOCUMENTS

| AU | 2012227169 B2 * | 2/2015 | ............. H04N 1/409 |
| EP | 3579139 A1 | 12/2019 | |

OTHER PUBLICATIONS

Mahmoodi, et al, "Boosting Performance of Face Detection by Using an Efficient Skin Segmentation Algorithm," 6th International Conference on Information Technology and Electrical Engineering (ICITEE), 2014.

(Continued)

*Primary Examiner* — Bernard Krasnic
(74) *Attorney, Agent, or Firm* — Blank Rome LLP

(57) ABSTRACT

Devices, methods, and non-transitory program storage devices are disclosed to: obtain an input image; identify a first face in the input image; divide the first face into a plurality of regions; identify obstructions in one or more of the plurality of regions; select a subset of regions, based on the identified obstructions; and determine a white point for the first face based, at least in part, on the selected subset of regions. In some embodiments, obstructions may be identified using a face obstruction detection model (e.g., a logistic regression model trained based on a large dataset of anno- (Continued)

tated facial images with and without obstructions). The identified obstructions may comprise, e.g., facial hair, head hair, glasses, a facial covering, a head covering, a face mask, or clothing. In some embodiments, a white balancing operation may be performed on the input image based, at least in part, on the determined white point.

20 Claims, 6 Drawing Sheets

(56) References Cited

U.S. PATENT DOCUMENTS

2015/0326884 A1 11/2015 Bae
2019/0082154 A1* 3/2019 Kang .................. G06T 7/90
2020/0104567 A1 4/2020 Tajbakhsh

OTHER PUBLICATIONS

Wang, et al., "Recognizing Human Faces under Disguise and Makeup," 2016 IEEE International Conference on Identity, Security and Behavior Analysis (ISBA).

* cited by examiner

OBSTRUCTION-SENSITIVE WHITE POINT DETERMINATION USING FACE INFORMATION

TECHNICAL FIELD

This disclosure relates generally to the field of digital image processing. More particularly, but not by way of limitation, it relates to techniques for determining image white points using obstruction-sensitive face detection information.

BACKGROUND

White point refers to a set of chromaticity coordinates or tristimulus values that defines the color of white in a captured image, encoding, reproduction, or portion thereof. If, for example, there are obstructions covering a portion of a subject's face in a captured image, and the pixels comprising such obstructions are included in white point calculations and/or white balancing operations (or other image color correction-related processing tasks, such as skin tone color correction) for the captured image, the colors of the pixels comprising such obstructions (which may, e.g., be from fabric, hair, or other materials that are different in color from that of typical facial skin tones) may significantly affect an image capture device's ability to determine an accurate white point (or accurately perform other image color correction-related processing tasks) for a face appearing in the captured image. This can potentially lead to sub-optimal downstream image processing operations. Thus, it would be desirable to train and leverage an intelligent face obstruction detection model, which could be used to identify and then ignore (or otherwise decrease the relative importance of) pixels comprising such detected obstructions in a captured image in any desired image color correction-related processing tasks.

SUMMARY

Devices, methods, and non-transitory program storage devices (NPSDs) are disclosed herein to provide for improved face obstruction detection models that may be leveraged to provide improved image processing, e.g., auto white balancing (AWB) or other image color correction-related processing tasks. According to some embodiments, there is provided a device, comprising: a memory; one or more image capture devices; and one or more processors operatively coupled to the memory, wherein the one or more processors are configured to execute instructions causing the one or more processors to: obtain an input image; identify a first face in the input image; divide the first face into a plurality of regions (e.g., upper half and lower half; left half and right half; quadrants, etc.); identify obstructions in one or more of the plurality of regions (e.g., facial hair, head hair, glasses, a facial covering, a head covering, a face mask, clothing, etc.); select a subset of regions, based on the identified obstructions; and determine a white point for the first face based, at least in part, on the selected subset of regions.

According to some embodiments, identifying the obstructions may comprise using a face obstruction detection model, such as a logistic regression model or other machine learning-based model trained to predict whether a given input image (or portion of an input image) has a facial obstruction or no facial obstructions present. According to some such embodiments, at least one independent variable in the logistic regression model may comprise a color value for a pixel in the input image.

According to other embodiments, if multiple faces are detected in the input image that are desired to be included in the obstruction-sensitive white point determination process, the obstruction-sensitive white point determination processing may be expanded to include performing operations upon each such detected face in the input image. According to some such embodiments, the device may be further programmed to perform a white balancing operation on the input image based, at least in part, on the determined white point for the first face and the determined white point(s) any other detected face(s) that are desired to be included in the obstruction-sensitive white point determination process.

According to still other embodiments, selecting the subset of regions may further comprise selecting a subset of regions wherein no obstruction was identified.

Various non-transitory program storage device (NPSD) embodiments are also disclosed herein. Such NPSDs are readable by one or more processors. Instructions may be stored on the NPSDs for causing the one or more processors to perform any of the embodiments disclosed herein. Various image processing methods are also disclosed herein, in accordance with the device and NPSD embodiments disclosed herein.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Figure 1:
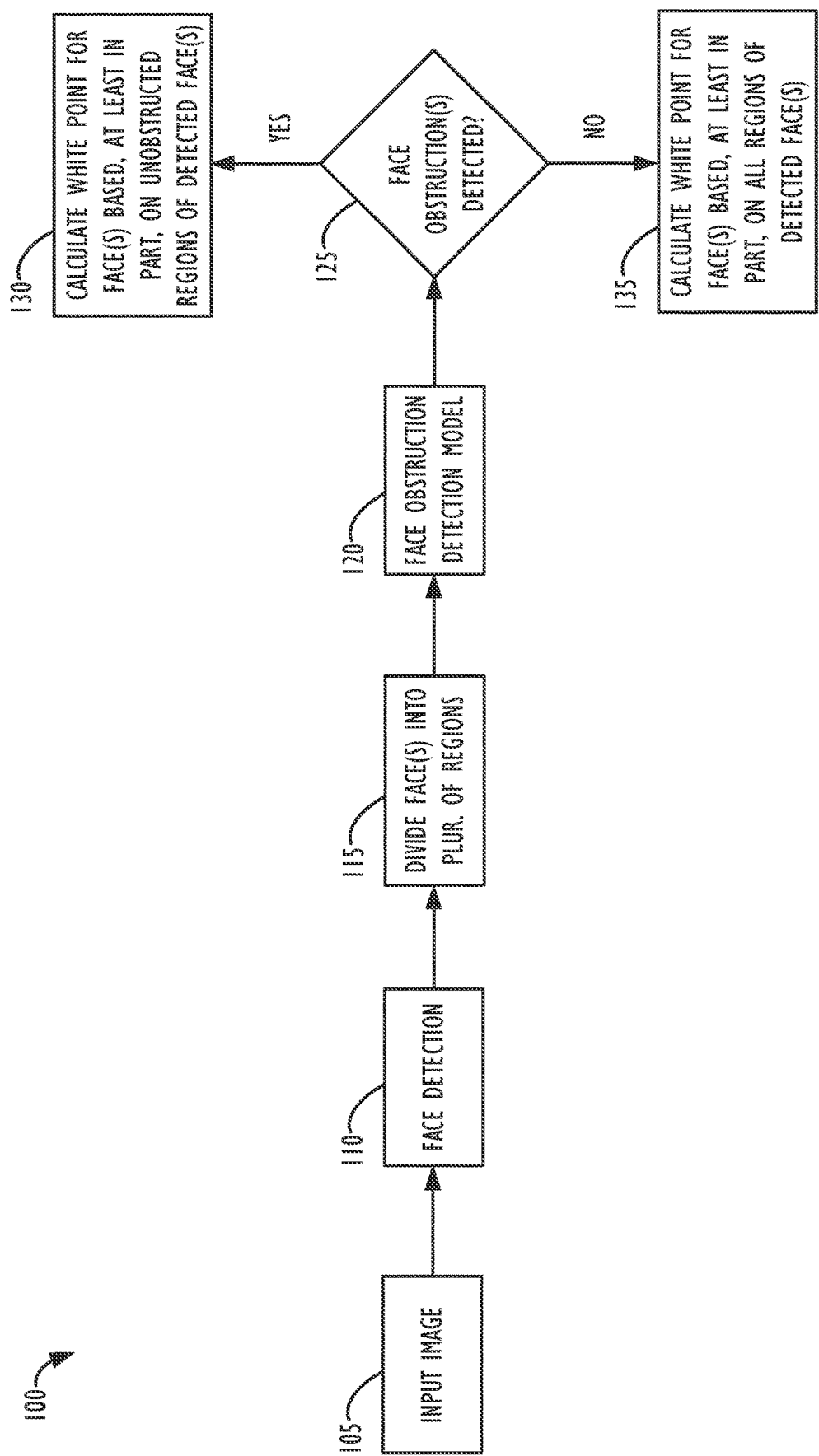
FIG. 1 is a block diagram illustrating an image processing system for determining image white points using obstruction-sensitive face detection information, according to one or more embodiments described herein.

As shown in FIG. 1, according to some embodiments, an image processing system (100) for determining image white points using obstruction-sensitive face detection information may begin by obtaining an input image (block 105). Next, a face detection operation (block 110) may be performed on the input image to determine a presence, location, pose, and/or size of one or more faces in the input image, e.g., using any desired facial detection algorithm(s). Next, at least a first face identified in the input image may be divided into a plurality of regions (block 115). For example, the regions of the identified face(s) may comprise: an upper region and lower region; an upper region, middle region, and lower region; a left-side region and right-side region, four quadrants, etc.

Next, the plurality of regions comprising the first face (and any other detected faces in the input image) may be sent to a face obstruction detection model (block 120) to determine whether or not there are likely any obstructions covering portions of the first face or other detected faces. In some embodiments, the output of the face obstruction detection model may comprise a binary 'yes' or 'no' determination (e.g., encoded as a score value of '1' or '0,' respectively) as to whether there is an obstruction detected in a given region of a detected face, wherein a region could span anywhere from a single pixel to hundreds or thousands of pixels in size. If region-level granularity is not available, the face obstruction detection model may also report a 'yes' or 'no' determination as to whether there is an obstruction detected covering any portion of the detected face, i.e., without identifying the particular region having the obstruction.

In other embodiments, the output of the face obstruction detection model may comprise a continuous value, e.g., an obstruction confidence value ranging between 0 and 1, reflecting the confidence with which the face obstruction detection model believes there to be an obstruction in a given region of the detected face. In such cases, an obstruction threshold may be defined, wherein, e.g., an obstruction threshold of 0.6 would cause any regions having a face obstruction confidence value of 0.6 or greater to be excluded from subsequent white point determination calculations, as will be explained in greater detail below. Examples of types of face obstructions that the face obstruction detection model may be trained to detect in captured images may include, e.g., beards (or other facial hair), head hair, large or oversized glasses or sunglasses, facial and/or head coverings, face masks, or clothing, such as scarves or hoods, etc. As will be understood, the face obstruction detection model may comprise a machine learning model and/or any other deterministic algorithm (e.g., a logistic regression model), as desired by a given implementation.

Next, at block 125, if one or more face obstructions are detected by the face obstruction detection model (i.e., "YES" at block 125), the system may proceed to block 130, wherein a white point may be calculated for the first face based, at least in part, on image statistics and/or data obtained from the unobstructed regions of the first face (e.g., discarding the image statistics and/or data obtained from the obstructed regions of the first face for the purposes of the white point calculation). Likewise, if any additional faces are detected, white points may also be calculated for each such additional face, based on image statistics and/or data obtained from their respective unobstructed regions. In embodiments, e.g., wherein an obstruction confidence value is used, rather than being discarded entirely, each region wherein an obstruction is detected may instead be weighted in the white point determination calculations according to its respective confidence value. If, instead, at block 125, one or more face obstructions are not detected by the face obstruction detection model (i.e., "NO" at block 125), the system may proceed to block 135, wherein a white point may be calculated for the first face based, at least in part, on image statistics and/or data obtained from each of the plurality of regions comprising the first face, i.e., calculated as would "normally" be done in a system that did not possess a face obstruction detection model. Likewise, if additional faces are detected, white points may also be calculated for each such additional face, based on image statistics and/or data obtained from their respective regions. If desired, in addition to any white points determined for detected faces in the input image (obstructed or otherwise), white points determined for other, e.g., non-facial, regions of input image (e.g., pixels from the background of the captured image and/or other surfaces in the image) may also be used to influence or partially determine a final calculated white point for the input image, as desired by the algorithm used in a particular implementation.

As may now be understood, the obstruction-sensitive white point(s) determined (e.g., at either block 130 or block 135) may be used for downstream image processing operations, such as auto white balancing (AWB) operations, and/or other image color correction-related processing tasks. As explained in further detail below with reference to FIG. 4B, if multiple faces are detected in the input image that are desired to be included in the obstruction-sensitive white point determination process, the processing of blocks 115, 120, 125, 130 and 135 may be expanded to include performing white point determination operations upon each such detected face in the input image. These "face-based" white points can be used to calculate "global" and/or "local" white points for the input image (i.e., a "global" white point, meaning that it represents the entire input image, and/or a "local" white point, meaning that it represents a subset of the pixels in the input image), and any or all of these white points may be used in downstream image processing operations, such as AWB operations, including being used in combination with determined white points for non-"face-based" regions of the input image to determine a global white point for the input image.

Figure 2:
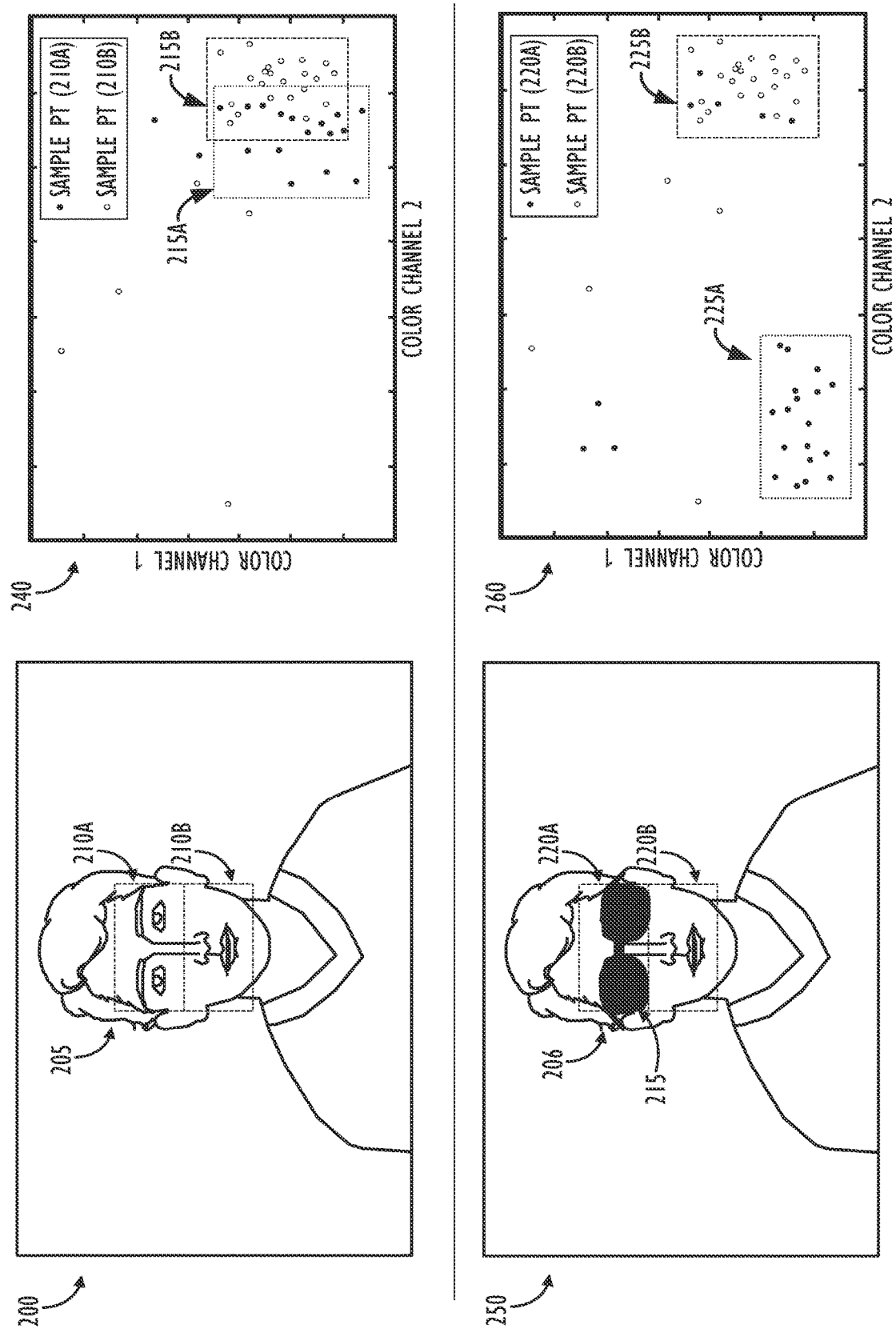
FIG. 2 shows an example of face obstruction detection, according to one or more embodiments described herein.

Turning now to FIG. 2, an example of face obstruction detection is shown, according to one or more embodiments described herein. Image 200 shows a sample image of a human subject face 205 with no facial obstructions divided into a plurality of regions (210A/210B). In this case, the regions 210A and 210B correspond to an upper portion and lower portion of human subject face 205, respectively, but, as discussed above, a subject face may be divided into different numbers, sizes, and/or types of regions, as desired by a given implementation.

Color graph 240 is a representation of the colors of various sampled pixels in image 200, plotted against two exemplary color channel axes (i.e., Color Channel 1 and Color Channel 2), which could represent any desired color channels for a given color correction-related processing task, e.g., green, blue, red, luminance, cyan, blue/green ratio, red/green ratio, etc.

As shown in the legend of color graph 240, black circles represent sample points (e.g., pixels) from upper face region 210A in image 200, and white circles represent sample points from lower face region 210B in image 200. As illustrated in color graph 240, the colors of the sample pixels from upper face region 210A cluster approximately in the region demarcated by dashed line box 215A, and the colors of the sample pixels from lower face region 210B cluster approximately in the region demarcated by dashed line box 215B. Because image 200 in this example depicts an image of a human subject face 205 with no facial obstructions, the regions 215A and 215B coincide fairly closely in the two-dimensional color space shown in color graph 240. This demonstrates that the colors of pixels in both the regions 210A and 210B are fairly overlapping, and thus a white point (or other image color correction-related processing task) could likely safely be calculated for the human subject face 205 based, at least in part, on all regions of human subject face 205B (i.e., both the regions 210A and 210B), without adversely affecting the image color correction-related processing task.

By contrast, image 250 shows a sample image of a human subject face 206 with a facial obstruction (i.e., large sunglasses 215), divided into a plurality of regions (220A/220B). In this case, the regions 220A and 220B also correspond to an upper portion and lower portion of human subject face 206, respectively. Color graph 260 is a representation of the colors of various sampled pixels in image 250, plotted against the same two exemplary color channel axes shown in color graph 240 (i.e., Color Channel 1 and Color Channel 2). Again, as shown in the legend of color graph 260, black circles represent sample points from upper face region 220A in image 250, and white circles represent sample points from lower face region 220 in image 250.

As illustrated in color graph 260, the colors of the sample pixels from upper face region 220A cluster approximately in the region demarcated by dashed line box 225A, and the colors of the sample pixels from lower face region 220B cluster approximately in the region demarcated by dashed line box 225B. Because image 250 in this example depicts an image of a human subject face 206 with a facial obstruction (i.e., large sunglasses 215), the regions 225A and 225B are located at fairly distinct locations in the two-dimensional color space shown in color graph 260. For example, the (likely) darker-colored pixels corresponding to the sunglasses in upper face region 220A and represented in region 225A occur more in the lower-left quadrant of color graph 260, and the (likely) lighter-colored pixels corresponding to the skin tones in lower face region 220 and represented in region 225B occur more in the lower-right quadrant of color graph 260. This demonstrates that the colors of pixels in both the regions 220A and 220B are fairly distinct, and, thus, a trained face obstruction model may detect the presence of an obstruction in region 220A. Likewise, a white point (or other image color correction-related processing task) calculated for the human subject face 206 based, at least in part, on all regions of human subject face 206, would possibly adversely affect the image color correction-related processing task. Thus, according to some embodiments, in such a scenario, a white point (or other image color correction-related processing task) may be calculated for the human subject face 206 based, at least in part, on only the unobstructed regions of human subject face 206, in this case, lower face region 220B, while ignoring (or decreasing the relative importance of) pixels in upper face region 220A. According to some embodiments, multiple (e.g., different) face obstruction models may be used in the analysis of a particular input image. For example, there could be different face obstruction models tailored and trained for particular regions of the face, such as a hair detection model for an upper portion of a face, a beard or face mask detection model for a lower portion of a face, and so forth, so that the facial obstruction detection is more accurate.

Figure 3:
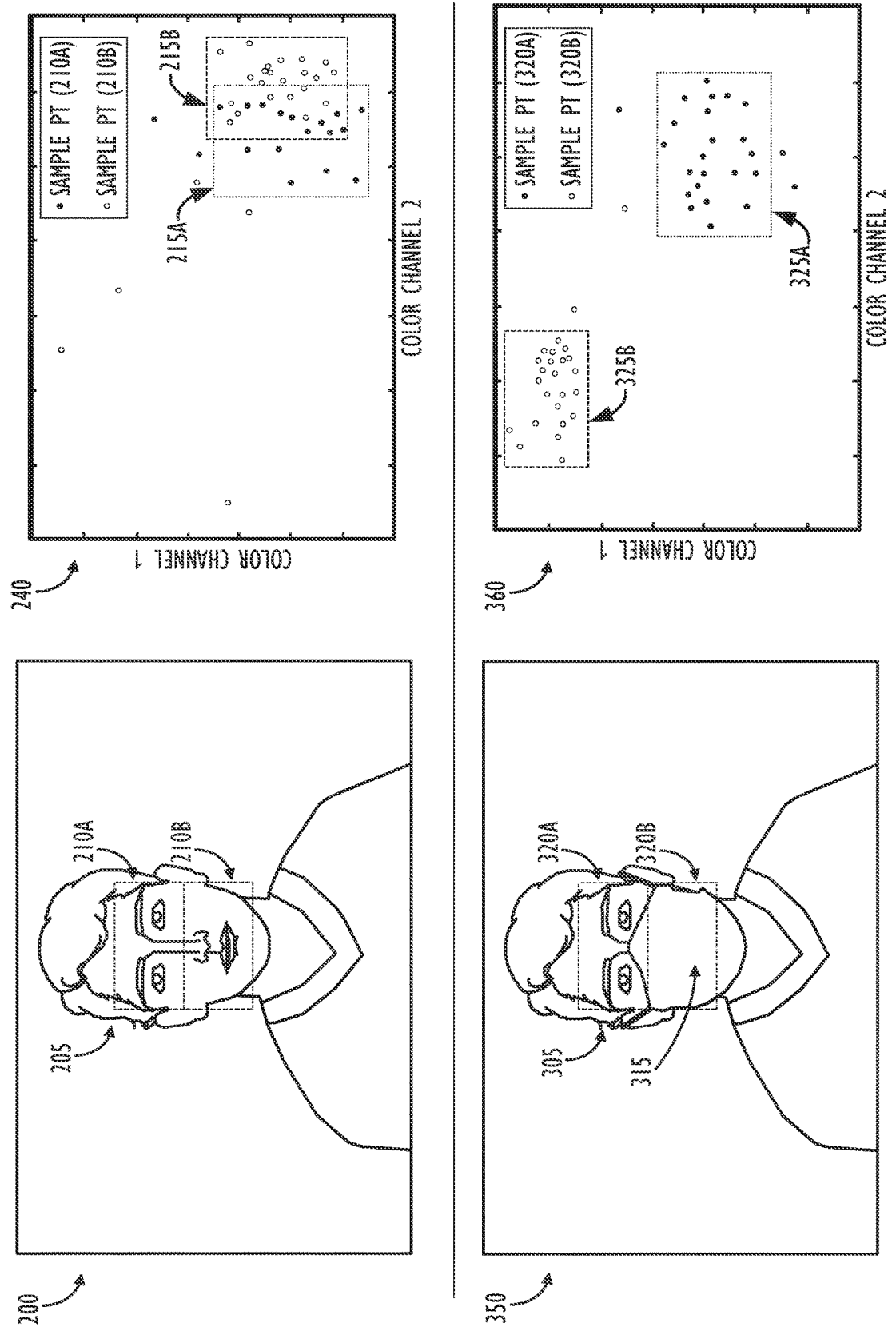
FIG. 3 shows another example of face obstruction detection, according to one or more embodiments described herein.

Turning now to FIG. 3, another example of face obstruction detection is shown, according to one or more embodiments described herein. Image 200, originally introduced with FIG. 2, showing a sample image of a human subject face 205 with no facial obstructions divided into a plurality of regions (210A/210B), is reproduced in FIG. 3, for ease of reference. As with image 250 in FIG. 2, image 350 in FIG. 3 shows a sample image of a human subject face 305 with a facial obstruction (i.e., face mask 315), divided into a plurality of regions (320A/320B). In this case, the regions 320A and 320B also correspond to an upper portion and lower portion of human subject face 305, respectively. Color graph 360 is a representation of the colors of various sampled pixels in image 350, plotted against the same two exemplary color channel axes shown in color graph 240 (i.e., Color Channel 1 and Color Channel 2). Again, as shown in the legend of color graph 360, black circles represent sample points from upper face region 320A in image 350, and white circles represent sample points from lower face region 320B in image 350.

As illustrated in color graph 360, the colors of the sample pixels from upper face region 320A cluster approximately in the region demarcated by dashed line box 325A, and the colors of the sample pixels from lower face region 320B cluster approximately in the region demarcated by dashed line box 325B. Because image 350 in this example depicts an image of a human subject face 350 with a facial obstruction (i.e., face mask 315), the regions 325A and 325B are located at fairly distinct locations in the two-dimensional color space shown in color graph 360. For example, the (likely) lighter-colored pixels corresponding to the face mask in lower face region 320B and represented in region 325B occur more in the upper-left quadrant of color graph 360, and the (likely) darker-colored pixels corresponding to the skin tones in upper face region 320A and represented in region 325A occur more in the lower-right quadrant of color graph 360. This demonstrates that the colors of pixels in both the regions 320A and 320B are fairly distinct, and, thus, a trained face obstruction model may detect the presence of an obstruction in region 320B. Likewise, a white point (or other image color correction-related processing task) calculated for the human subject face 305 based, at least in part, on all regions of human subject face 305, would possibly adversely affect the image color correction-related processing task. Thus, according to some embodiments, in such a scenario, a white point (or other image color correction-related processing task) may be calculated for the human subject face 305 based, at least in part, on only the unobstructed regions of human subject face 305, in this case, upper face region 320A, while ignoring (or decreasing the relative importance of) pixels in lower face region 320B.

Figure 4A:
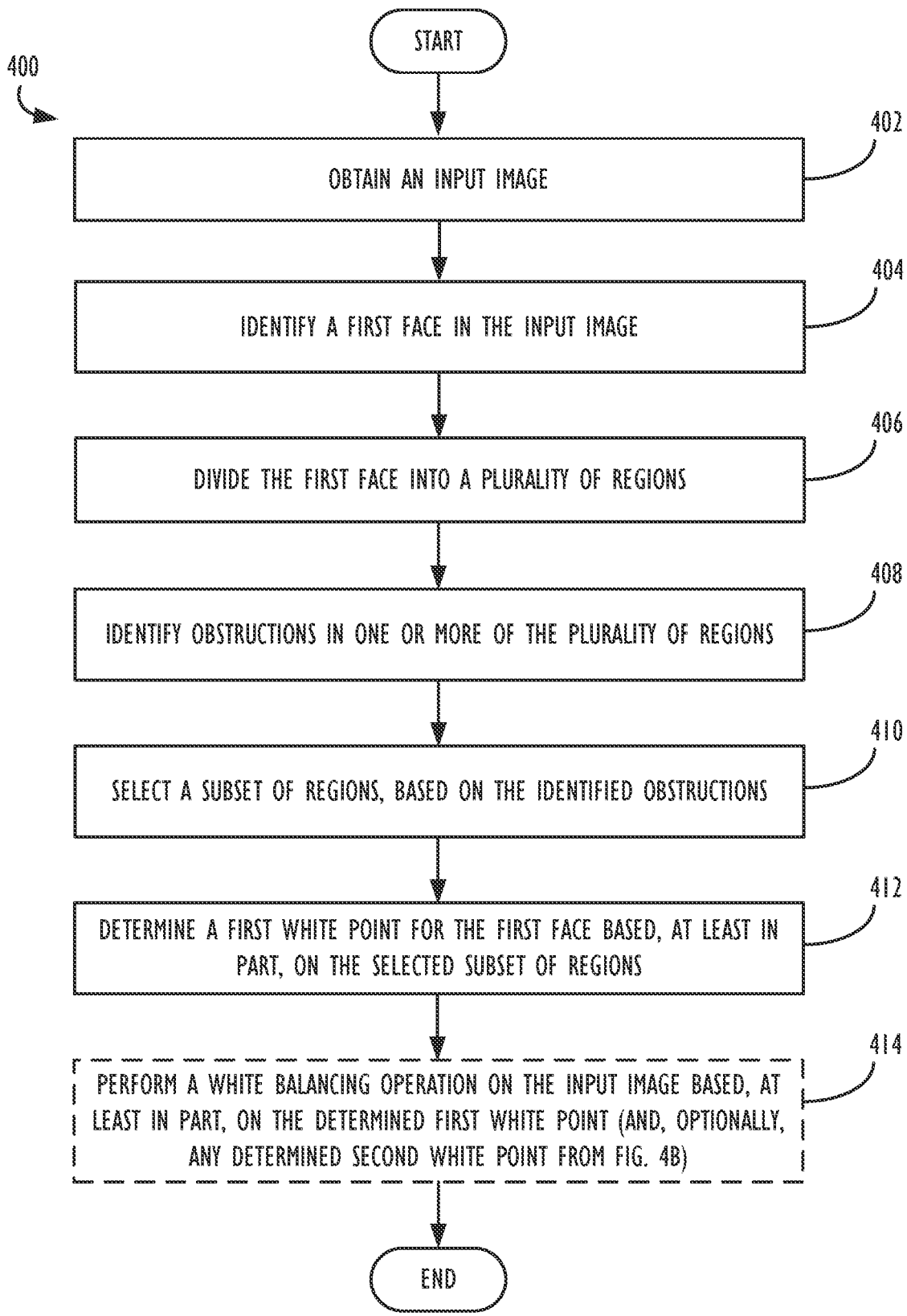
FIGS. 4A and 4B are flow charts illustrating methods for determining image white points using obstruction-sensitive face detection information, according to one or more embodiments described herein.

Turning now to FIG. 4A, a flow chart illustrating a method 400 for determining image white points using obstruction-sensitive face detection information, according to one or more embodiments described herein. First, at Step 402, the method 400 may begin by obtaining an input image. Next, at Step 404, the method 400 may identify a first face in the input image. In some embodiments, a face may have to pass one or more quality thresholds before qualifying to be included in the operation of process 400 (e.g., a minimum size requirement, a motion/stability requirement, a lux requirement, a sharpness requirement, a duration within scene requirement, etc.).

Next, at Step 406, the method 400 may divide the first face into a plurality of regions (e.g., an upper half and lower half; a left half and right half; quadrants, etc.) The granularity and number of regions that a given identified face is divided into may be dependent on a given implementation and/or a size of the identified face, a quality metric of the identified face, an overall number of faces identified in the input image, etc.

Next, at Step 408, the method 400 may identify obstructions in one or more of the plurality of regions. As mentioned above, obstructions may comprise facial hair, head hair, large or oversized glasses or sunglasses, facial and/or head coverings, face masks, or clothing, such as scarves or hoods, etc., or any other pixels having a color and/or texture that is determined not to be indicative of a human skin tones, e.g., according to a trained face obstruction detection model.

Next, at Step 410, the method 400 may select a subset of regions, based on the identified obstructions. For example, in some embodiments, the method 400 may only select regions that have no obstruction pixels detected within them. In other embodiments, the method 400 may select regions that have fewer than a threshold number of obstruction pixels (e.g., 5% obstructed pixels) detected within them.

Next, at Step 412, the method 400 may determine a first white point (or determine any other desired image color correction-related property, e.g., skin color distribution) for the first face based, at least in part, on the selected subset of regions (e.g., based only on the pixels within the selected subset of regions that are determined to be non-obstructed pixels, such as skin pixels, within the selected subset of regions).

Figure 4B:
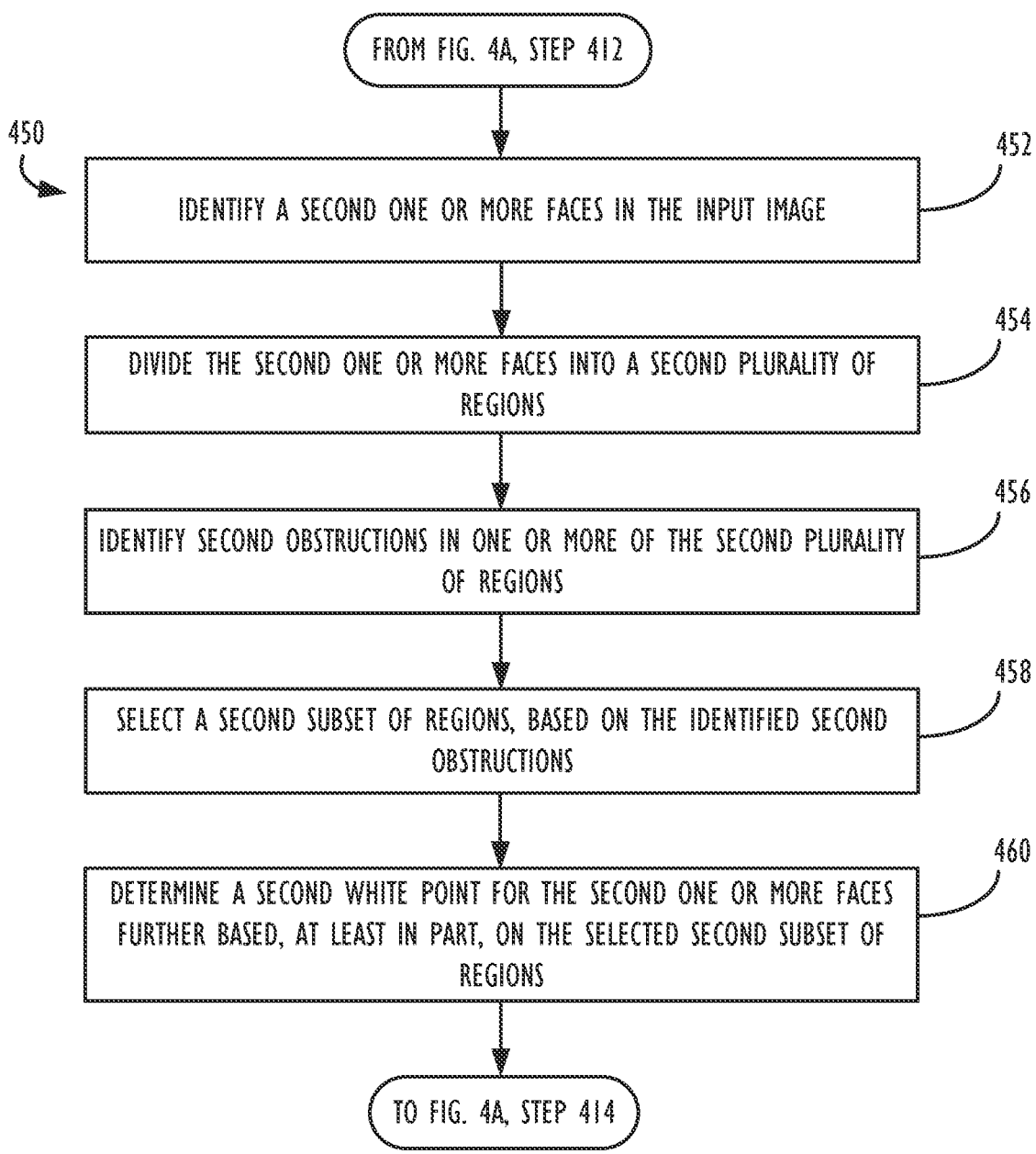

Finally, at Step 414, the method 400 may optionally perform a white balancing operation (or perform any other desired image color correction-related processing task, e.g., skin tone color correction) on the input image based, at least in part, on the determined first white point (or other desired image color correction-related property, e.g., skin color distribution) and, optionally, as will be described in greater detail below and with reference to FIG. 4B, any determined second white point for an additional "qualifying" face(s) detected in the input image. Qualifying faces, as used herein, may comprise any detected face in an input image meeting the criteria being used by a given implementation. The qualifying face criteria may, e.g., include characteristics such as a minimum size requirement, a motion/stability requirement, a lux requirement, a sharpness requirement, a duration within scene requirement, etc.

It is to be understood that multiple faces may also be identified in the input image, with the processing of Steps 406/408/410 effectively being repeated for each qualifying identified face. For example, in FIG. 4B, a flow chart illustrating a method 450 for determining image white points using obstruction-sensitive face detection information from multiple faces in an input image is shown, according to one or more embodiments described herein. First, at Step 452, the method 450 may extend the method 400 of FIG. 4A (e.g., after performance of Step 412) by identifying a second one or more faces in the input image (e.g., any additional qualifying faces identified in the input image beyond the first face). Next, at Step 454, the method 450 may divide the second one or more faces into a second plurality of regions. Next, at Step 456, the method 450 may identify second obstructions in one or more of the second plurality of regions. Next, at Step 458, the method 450 may select a second subset of regions, based on the identified second obstructions. At Step 460, the method 450 may determine a second white point for the second one or more faces further based, at least in part, on the selected second subset of regions. (It is to be understood that the second white point may represent a white point for just a second identified face, specifically, or it may represent a collective white point for every identified qualifying face in the input image beyond the first face. Likewise, in some implementations, if desired, a separate face-based white point may be calculated and tracked for each identified qualifying face in the input image and then the plurality of face-based white points may be combined, as desired by a given implantation, when determining a global image white point and/or performing AWB operations on the input image.) Finally, the method 450 may return to Step 414 of method 400 and, if desired, perform a white balancing operation (or other image color correction-related processing task) on the input image based, at least in part, on the determined first white point from Step 412 and, optionally, any determined second white point (as well as any additional white points determined for other specific faces in the input image) from Step 460 of FIG. 4B. As may now be understood, the white balancing operation performed on the input image may be based, at least in part, on any unobstructed pixels (e.g., skin pixels) from each qualifying identified face in the input image. As mentioned above, the final white balancing operation for the input image may further be based, at least in part, on any desired non-facial regions of input image (e.g., pixels from the background of the captured image and/or other surfaces in the image).

Exemplary Electronic Computing Devices

Figure 5:
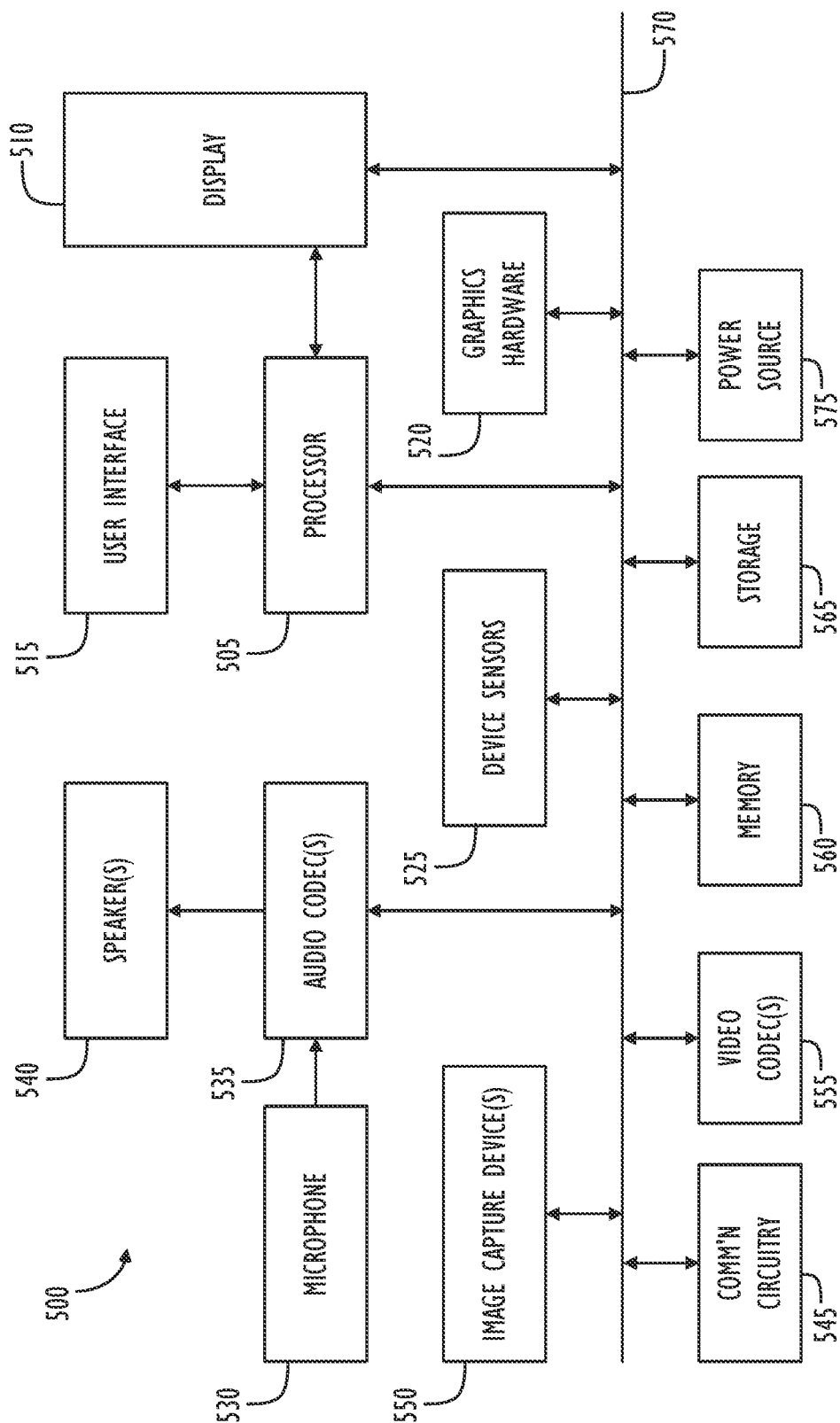
FIG. 5 is a block diagram illustrating a programmable electronic computing device, in which one or more of the techniques disclosed herein may be implemented.

Referring now to FIG. 5, a simplified functional block diagram of illustrative programmable electronic computing device 500 is shown according to one embodiment. Electronic device 500 could be, for example, a mobile telephone, personal media device, portable camera, or a tablet, notebook or desktop computer system. As shown, electronic device 500 may include processor 505, display 510, user interface 515, graphics hardware 520, device sensors 525 (e.g., proximity sensor/ambient light sensor, accelerometer, inertial measurement unit, and/or gyroscope), microphone 530, audio codec(s) 535, speaker(s) 540, communications circuitry 545, image capture device 550, which may, e.g., comprise multiple camera units/optical image sensors having different characteristics or abilities (e.g., Still Image Stabilization (SIS), HDR, OIS systems, optical zoom, digital zoom, etc.), video codec(s) 555, memory 560, storage 565, and communications bus 570.

Processor 505 may execute instructions necessary to carry out or control the operation of many functions performed by electronic device 500 (e.g., such as the generation and/or processing of images in accordance with the various embodiments described herein). Processor 505 may, for instance, drive display 510 and receive user input from user interface 515. User interface 515 can take a variety of forms, such as a button, keypad, dial, a click wheel, keyboard, display screen and/or a touch screen. User interface 515 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 510 may display a video stream as it is captured while processor 505 and/or graphics hardware 520 and/or image capture circuitry contemporaneously generate and store the video stream in memory 560 and/or storage 565. Processor 505 may be a system-on-chip (SOC) such as those found in mobile devices and include one or more dedicated graphics processing units (GPUs).

Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 perform computational tasks. In one embodiment, graphics hardware 520 may include one or more programmable graphics processing units (GPUs) and/or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device 550 may comprise one or more camera module units configured to capture images, e.g., images which may be processed to generate color-corrected versions of said captured images, e.g., in accordance with this disclosure. Output from image capture device 550 may be processed, at least in part, by video codec(s) 555 and/or processor 505 and/or graphics hardware 520, and/or a dedicated image processing unit or image signal processor incorporated within image capture device 550. Images so captured may be stored in memory 560 and/or storage 565. Memory 560 may include one or more different types of media used by processor 505, graphics hardware 520, and image capture device 550 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to retain computer program instructions or code organized into one or more modules and written in any desired computer programming language. When executed by, for example, processor 505, such computer program code may implement one or more of the methods or processes described herein. Power source 575 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 500.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. An image processing method, comprising:
    obtaining an input image;
    identifying a first face in the input image;
    dividing the first face into a plurality of regions;
    identifying obstructions in one or more of the plurality of regions;
    selecting a subset of regions based on the identified obstructions;
    determining a first white point based, at least in part, on the selected subset of regions;
    identifying a second one or more faces in the input image;
    dividing the second one or more faces into a second plurality of regions;
    identifying second obstructions in one or more of the second plurality of regions;
    selecting a second subset of regions based on the identified second obstructions;
    determining a second white point further based, at least in part, on the selected second subset of regions; and
    performing a white balancing operation on the input image based, at least in part, on the determined first white point and the determined second white point.

2. The method of claim 1, wherein identifying obstructions further comprises identifying obstructions using a face obstruction detection model.

3. The method of claim 2, wherein the face obstruction detection model comprises a logistic regression model or a machine learning model.

4. The method of claim 1, wherein selecting a subset of regions further comprises selecting a subset of regions wherein no obstruction was identified.

5. The method of claim 1, wherein selecting a second subset of regions based on the identified second obstructions further comprises: selecting a second subset of regions wherein no obstruction was identified.

6. The method of claim 1, wherein selecting a subset of regions based on the identified obstructions further comprises: selecting a subset of regions wherein fewer than a threshold number of obstruction pixels were detected.

7. The method of claim 1, wherein selecting a second subset of regions based on the identified second obstructions further comprises selecting a second subset of regions wherein fewer than a threshold number of obstruction pixels were detected.

8. A device, comprising:
    a memory configured to store instructions;
    one or more image capture devices; and
    one or more processors operatively coupled to the memory, wherein the one or more processors are configured to execute the instructions causing the one or more processors to:
    obtain an input image;
    identify a first face in the input image;
    divide the first face into a plurality of regions;
    identify obstructions in one or more of the plurality of regions;
    select a subset of regions based on the identified obstructions;
    determine a first white point based, at least in part, on the selected subset of regions;
    identify a second one or more faces in the input image;
    divide the second one or more faces into a second plurality of regions;
    identify second obstructions in one or more of the second plurality of regions;
    select a second subset of regions based on the identified second obstructions;
    determine a second white point further based, at least in part, on the selected second subset of regions; and
    perform a white balancing operation on the input image based, at least in part, on the determined first white point and the determined second white point.

9. The device of claim 8, wherein the instructions causing the one or more processors to identify obstructions further comprise instructions causing the one or more processors to: identify obstructions using a face obstruction detection model.

10. The device of claim 9, wherein the face obstruction detection model comprises a logistic regression model or a machine learning model.

11. The device of claim 8, wherein the instructions causing the one or more processors to select a subset of regions further comprise instructions causing the one or more processors to: select a subset of regions wherein no obstruction was identified.

12. The device of claim 8, wherein the instructions causing the one or more processors to select a second subset of regions based on the identified second obstructions further comprise instructions causing the one or more processors to: select a second subset of regions wherein no obstruction was identified.

13. The device of claim 8, wherein the instructions causing the one or more processors to select a subset of regions based on the identified obstructions further comprise instructions causing the one or more processors to: selecting a subset of regions wherein fewer than a threshold number of obstruction pixels were detected.

14. The device of claim 8, wherein the instructions causing the one or more processors to select a second subset of regions based on the identified second obstructions further comprise instructions causing the one or more processors to: selecting a second subset of regions wherein fewer than a threshold number of obstruction pixels were detected.

15. A non-transitory computer readable medium comprising computer readable instructions executable by one or more processors to:
   obtain an input image;
   identify a first face in the input image;
   divide the first face into a plurality of regions;
   identify obstructions in one or more of the plurality of regions;
   select a subset of regions based on the identified obstructions;
   determine a first white point based, at least in part, on the selected subset of regions;
   identify a second one or more faces in the input image;
   divide the second one or more faces into a second plurality of regions;
   identify second obstructions in one or more of the second plurality of regions;
   select a second subset of regions based on the identified second obstructions;
   determine a second white point further based, at least in part, on the selected second subset of regions; and
   perform a white balancing operation on the input image based, at least in part, on the determined first white point and the determined second white point.

16. The non-transitory computer readable medium of claim 15, wherein the instructions to identify obstructions further comprise instructions executable by one or more processors to: identify obstructions using a face obstruction detection model.

17. The non-transitory computer readable medium of claim 16, wherein the face obstruction detection model comprises a logistic regression model or a machine learning model.

18. The non-transitory computer readable medium of claim 15, wherein the instructions to select a second subset of regions based on the identified second obstructions further comprise instructions executable by one or more processors to: select a second subset of regions wherein no obstruction was identified.

19. The non-transitory computer readable medium of claim 15, wherein the instructions to select to select a subset of regions based on the identified obstructions further comprise instructions executable by one or more processors to: selecting a subset of regions wherein fewer than a threshold number of obstruction pixels were detected.

20. The non-transitory computer readable medium of claim 15, wherein the instructions to select a second subset of regions based on the identified second obstructions further comprise instructions executable by one or more processors to: selecting a second subset of regions wherein fewer than a threshold number of obstruction pixels were detected.

* * * * *

UNITED STATES PATENT AND TRADEMARK OFFICE
CERTIFICATE OF CORRECTION

| | | |
|---|---|---|
| PATENT NO. | : 11,935,322 B1 | Page 1 of 1 |
| APPLICATION NO. | : 17/369416 | |
| DATED | : March 19, 2024 | |
| INVENTOR(S) | : Renbo Cao et al. | |

It is certified that error appears in the above-identified patent and that said Letters Patent is hereby corrected as shown below:

In the Claims

Column 11 Line 23: replace the phrase "processors to: selecting" with the phrase --processors to: select--;

Column 11 Line 30: replace the phrase "selecting a second subset of regions" with the phrase --select a second subset of regions--;

Column 12 Line 29: replace the phrase "wherein the instructions to select to select" with the phrase --wherein the instructions to select--;

Column 12 Line 32: replace the phrase "selecting a subset of regions" with the phrase --select a subset of regions--;

Column 12 Line 38: replace the phrase "selecting a second subset of regions" with the phrase --select a second subset of regions--.

Signed and Sealed this
Thirtieth Day of April, 2024

Katherine Kelly Vidal
*Director of the United States Patent and Trademark Office*